United States Patent [19]

Kim

[11] Patent Number: 5,809,319

[45] Date of Patent: Sep. 15, 1998

[54] HIGH SPEED LADDER INSTRUCTION PROCESS SYSTEM FOR A PROGRAMMABLE LOGIC CONTROLLER

[75] Inventor: Young-ki Kim, Pusan, Rep. of Korea

[73] Assignee: Samsung Aerospace Industries, Ltd., Kyeongsangnam-do, Rep. of Korea

[21] Appl. No.: 781,521

[22] Filed: Jan. 9, 1997

Related U.S. Application Data

[63] Continuation of Ser. No. 461,537, Jun. 5, 1995, abandoned, which is a continuation of Ser. No. 82,971, Jun. 29, 1993, abandoned.

[30] Foreign Application Priority Data

Jun. 30, 1992 [KR] Rep. of Korea .................. 1992-11576

[51] Int. Cl.⁶ ..................................................... G06F 9/00
[52] U.S. Cl. ........................ 395/800; 395/595; 364/232.8; 364/262.4; 364/DIG. 1
[58] Field of Search ............................... 395/200.05, 825, 395/842, 438, 800, 550, 670, 672, 376, 561, 595; 364/131–134

[56] References Cited

U.S. PATENT DOCUMENTS

| | | | |
|---|---|---|---|
| 3,982,230 | 9/1976 | Burkett et al. ........................... | 395/275 |
| 4,122,519 | 10/1978 | Bielawski et al. ....................... | 395/600 |
| 4,417,304 | 11/1983 | Dinwiddie, Jr. ......................... | 395/845 |
| 4,742,443 | 5/1988 | Rohn et al. .............................. | 364/136 |
| 4,958,304 | 9/1990 | Moore ..................................... | 345/201 |
| 4,972,365 | 11/1990 | Dodds et al. ............................ | 395/825 |
| 5,125,088 | 6/1992 | Culley ..................................... | 395/500 |
| 5,212,779 | 5/1993 | Saito ....................................... | 395/375 |
| 5,220,656 | 6/1993 | Itomitsu et al. ......................... | 395/375 |
| 5,225,974 | 7/1993 | Mathews et al. ........................ | 364/140 |
| 5,319,783 | 6/1994 | Zink et al. ............................... | 395/700 |
| 5,390,350 | 2/1995 | Chung et al. ............................ | 395/750 |

*Primary Examiner*—Alpesh M. Shah
*Attorney, Agent, or Firm*—Finnegan, Henderson, Farabow, Garrett & Dunner, L.L.P.

[57] ABSTRACT

A high speed instruction process system for a programmable logic controller having a first memory for storing one or more user instructions, which each instruction corresponds to a different process cycle, circuitry for processing the user instruction, a second memory for storing one or more user data, which each data corresponds to a different process cycle, circuitry for accessing a stored user data, and circuitry for processing an accessed user data in accordance with a processed user instruction, wherein the user data corresponding to a process cycle is accessed at the substantially same time as the user instruction corresponding to a different process cycle is processed.

9 Claims, 4 Drawing Sheets

USER PROGRAM MEMORY
EXECUTION INSTRUCTION CODE

OPERAND

| | 15 12 | 11 4 | 3 0 | MNEMONIC | |
|---|---|---|---|---|---|
| ADDRESS | OPERATION CODE | WORD ADDRESS | BIT NO. | | |
| 0000 | 0 | 00 | 0 | STR | 0000 |
| 0001 | 3 | 00 | 1 | AND NOT | 0001 |
| 0002 | 6 | 01 | 0 | OUT | 0016 |
| 0003 | 1 | 00 | 2 | STR NOT | 0002 |
| 0004 | 5 | 02 | 4 | OR NOT | 0036 |
| 0005 | 6 | 01 | 1 | OUT | 0017 |
| 0006 | F | XX | X | END | |
| | | | | | |

FIG.2B

USER DATA MEMORY

| ADDRESS | 15           0 |
|---|---|
| 00 | 0001 |
| 01 | 5432 |
| 02 | 8000 |
| | |

HIGH SPEED LADDER INSTRUCTION PROCESS SYSTEM FOR A PROGRAMMABLE LOGIC CONTROLLER

This application is a continuation of application Ser. No. 08/461,537, filed Jun. 5,1995, now abandoned, which is a continuation of application Ser. No. 08/082,971, filed Jun. 29,1993, now abandoned.

BACKGROUND OF THE INVENTION

1. Field of the Invention

The present invention relates to a high speed ladder instruction process system for a programmable logic controller.

2. Description of the Prior Art

In a conventional programmable logic controller ("PLC"), each ladder instruction is processed in the central processing unit (CPU) using a built-in program. In the conventional PLC with a single bus system structure, the processing of each instruction requires several microseconds ($\mu s$), and this long process time of the instruction adversely influences the overall processing time of the system. Particularly, when a supplementary circuit is used in such a conventional PLC, it requires several bus cycles to process each instruction, requiring a long overall process time for the system.

SUMMARY OF THE INVENTION

The object of the present invention is to reduce the process time of the ladder instruction for a programmable logic controller. To achieve the object and in accordance with the purpose of the invention, as embodied and broadly described herein, the programmable logic controller of the present invention uses a high speed ladder instruction process system and such a high speed ladder instruction process system comprises first means for storing one or more user instructions, each instruction corresponding to a different process cycle; second means, coupled to the first means, for processing the user instruction; third means for storing one or more user data, each data corresponding to a different process cycle; fourth means, coupled to the third means, for accessing a stored user data, and fifth means, coupled to the second and fourth means, for processing an accessed user data in accordance with a processed user instruction, wherein the user data corresponding to a first process cycle is accessed by the fourth means at the substantially same time as the user instruction corresponding to a second process cycle different than the first process cycle is processed by the second means.

According to the ladder instruction process system of the present invention, to reduce the time to process each instruction, the execution/read operations of the instruction are simultaneously carried out within the same bus cycle by using a plurality of bus systems, each bus system constituting an address bus and a data bus.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1A:
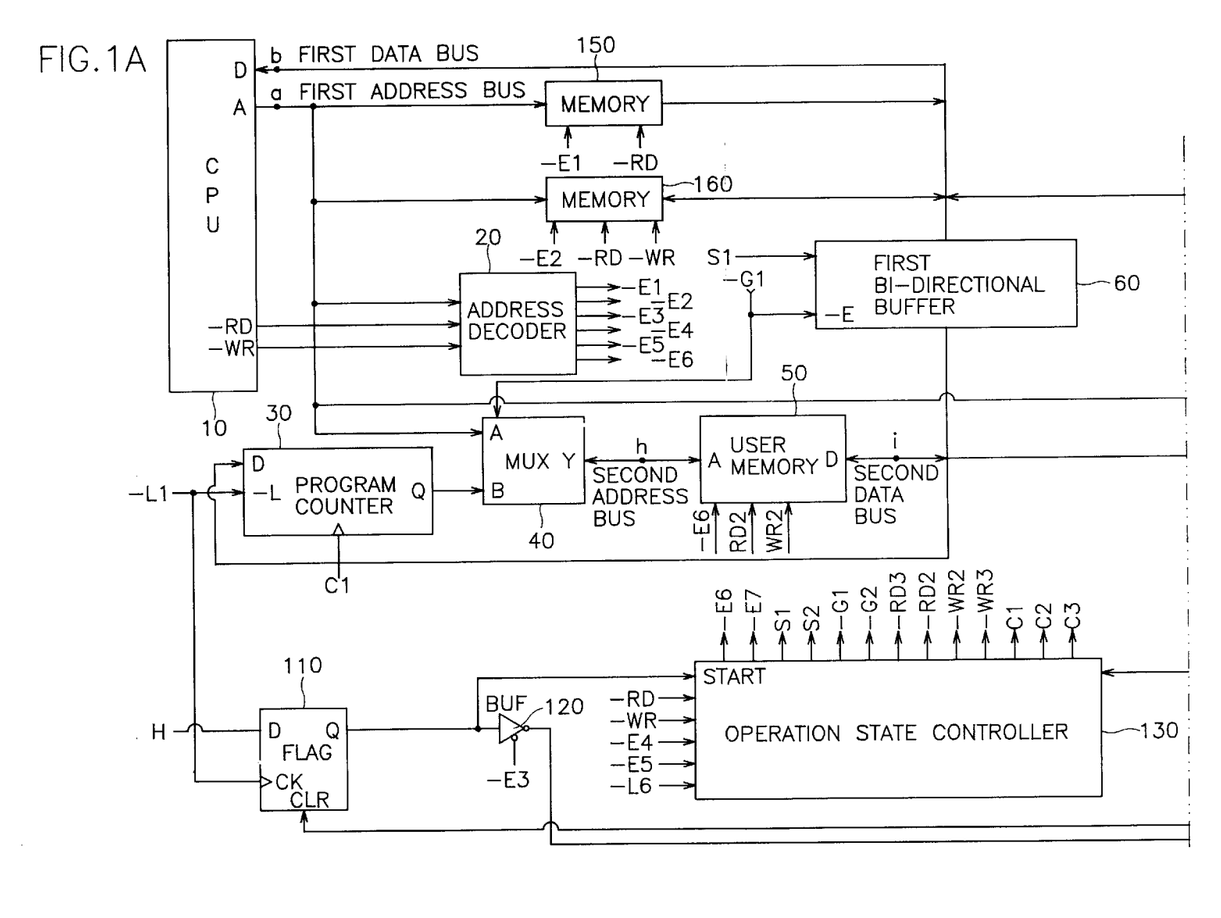
FIG. 1A is a half portion of a block diagram of a programmable logic controller having a high speed ladder instruction process system according to an embodiment of the present invention.
Figure 1B:
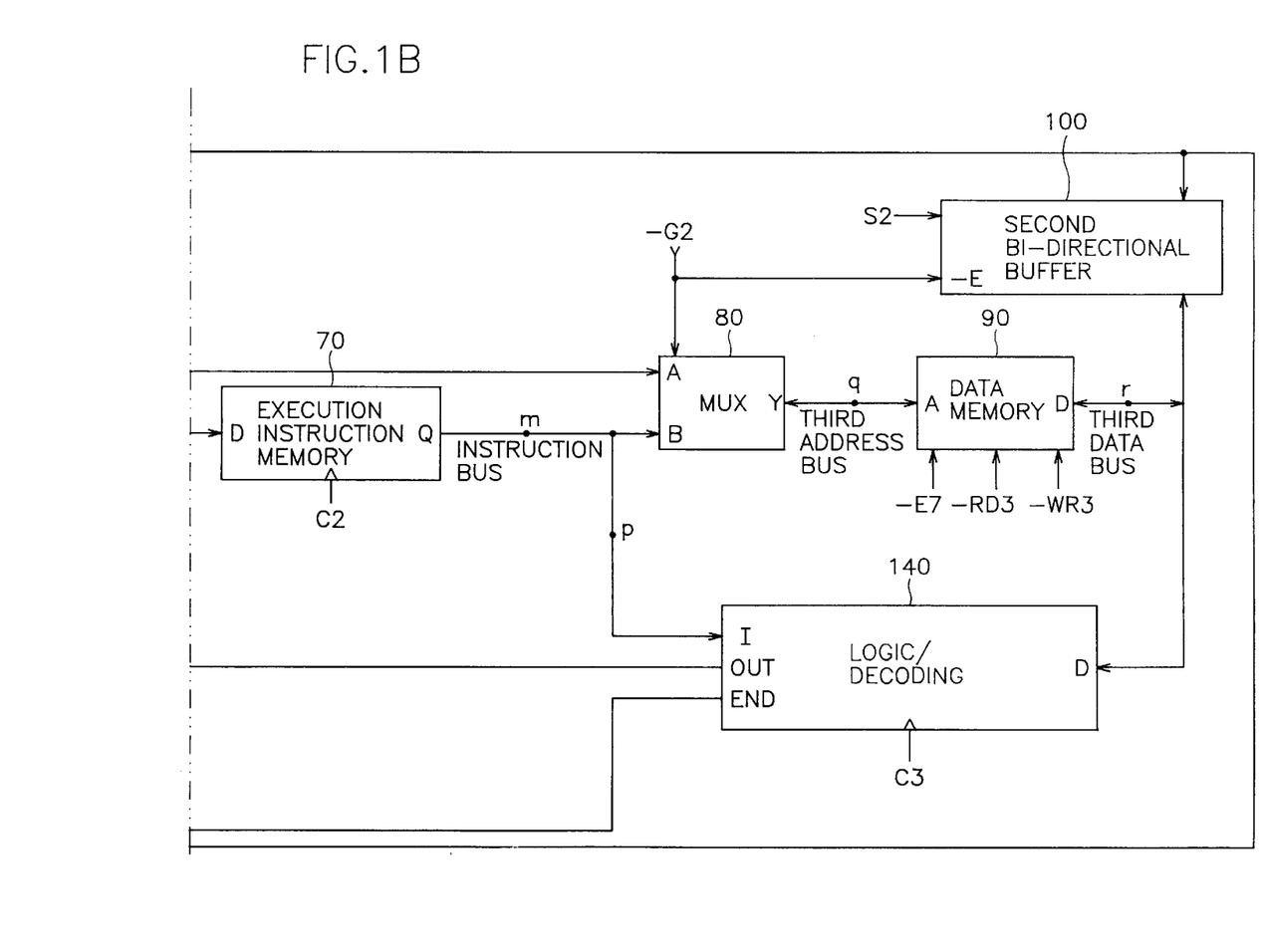
FIG. 1B is another half portion of the block diagram of the programmable logic controller of FIG. 1B.

Referring to FIGS. 1A and 1B, the programmable logic controller (PLC) includes a central processing unit (CPU) 10 for controlling all operations of the PLC. An address decoder 20 is connected to CPU 10 via a first address bus. Memory 150, 160 is connected to CPU for storing data therein via a first data bus. The first address and data buses collectively constitute a first bus system.

The PLC, as embodied herein, includes a high speed ladder instruction process system ("instruction process system"). The instruction process system, as embodied herein, preferably includes a program counter (or user program counter) 30 for providing an address for each ladder instruction (hereinafter "execution instruction") in response to a clock signal Cl and a latch signal –L1 applied to program counter 30. The instruction process system next includes a first multiplexer MUX 40 with an input terminal A connected to CPU 10 via the first address bus and an input terminal B to program counter 30. MUX 40 selects data from either input terminal A or B in accordance with control signal –G1, and provides the selected data to a second address bus.

The instruction process system next includes a user memory 50 connected to first multiplexer 40 for storing therein the execution instruction defined by the user of the PLC in the address provided from the second address bus and provides the stored execution instruction to a second data bus. The second address and data buses collectively constitutes a second bus system.

The PLC, embodied herein, further includes a first bidirectional buffer 60 connected to CPU 10 via the first bus system. Buffer 60 is used as buffer when CPU 10 stores data in user memory or user program memory 50 or reads data therefrom, and also when CPU 10 initializes, i.e., sets the initial value of, program counter 30.

The instruction process system of the PLC, as embodied herein, next includes an execution instruction memory 70 connected to user memory 50. Instruction memory 70 temporarily stores the execution instruction accessed from user memory 50 via the second data bus in a designated order. The instruction process system next includes a second multiplexer MUX 80 with a terminal A connected to CPU 10 and a terminal B to execution instruction memory 70 via an instruction bus. MUX 80 selects data from either one of these two input terminals in accordance with a control signal –G2 and provides the selected data to a third address bus. The instruction process system next includes a data memory 90 connected to second multiplexer 80. Data memory 90 stores user data supplied by the user in the address provided from the third address bus.

The PLC, embodied herein, further includes a second bidirectional buffer 100 which is connected to CPU 10 through the first bus system, and which facilitates CPU 10 to read the user data from and/or write the user data into data memory or user data memory 90. The instruction process system of the PLC, as embodied herein, next includes a flag register 110 for controlling the execution of the execution instruction, and a buffer 120 connected to flag register 110 for facilitating CPU 10 to check the state of flag register 110.

The instruction process system next includes an operation state controller 130 connected to flag register 110. Controller 130 produces one or more control signals to control the operation associated with the execution of the execution instruction in accordance with the state of flag register 110. The instruction process system next includes an logic/decoding unit 140 connected to operation state controller 130. Logic/decoding unit 140 decodes the execution instruction and performs logical operation using the user data provided from the third bus system in accordance with the decoded execution instruction.

The operation of the PLC having the high speed ladder instruction process system of the present invention, as embodied above, is explained below.

CPU 10 provides a signal having a low level "L" (i.e., a "0000" state) to an input terminal D of program counter 30 via first bidirectional buffer 60, to initialize program counter 30, i.e., set an output terminal Q of program counter 30 to a zero "0" value. When operation state controller 130 provides control signals –G1 and –G2 having a high level "H" (i.e., opposite the "0000" state) concurrently to an enable terminal –E of first and second bidirectional buffers 60 and 100, respectively and to input terminal A of first and second multiplexers 40 and 80, respectively, the signal at output terminal Q of program counter 30 and an output terminal Q of execution instruction memory 70 is provided to input terminal B of first and second multiplexers 40 and 80, respectively.

Program counter 30 provides a counting signal having a magnitude which increases incrementally whenever clock signal C1 is applied to clock terminal C1 of program counter 30, and the incremented counting signal is then provided to first multiplexer 40. Then, when control signal –G1 has the high level "H", the incremented counting signal is provided to user memory 50 via the second address bus to designate a corresponding address in user memory 50. Then, the user defined execution instruction stored in the corresponding address of user memory 50 is read out and provided to execution instruction memory 70 via the second data bus. Execution instruction memory 70 then temporarily stores the execution instruction provided from the second bus system therein.

Figure 2A:
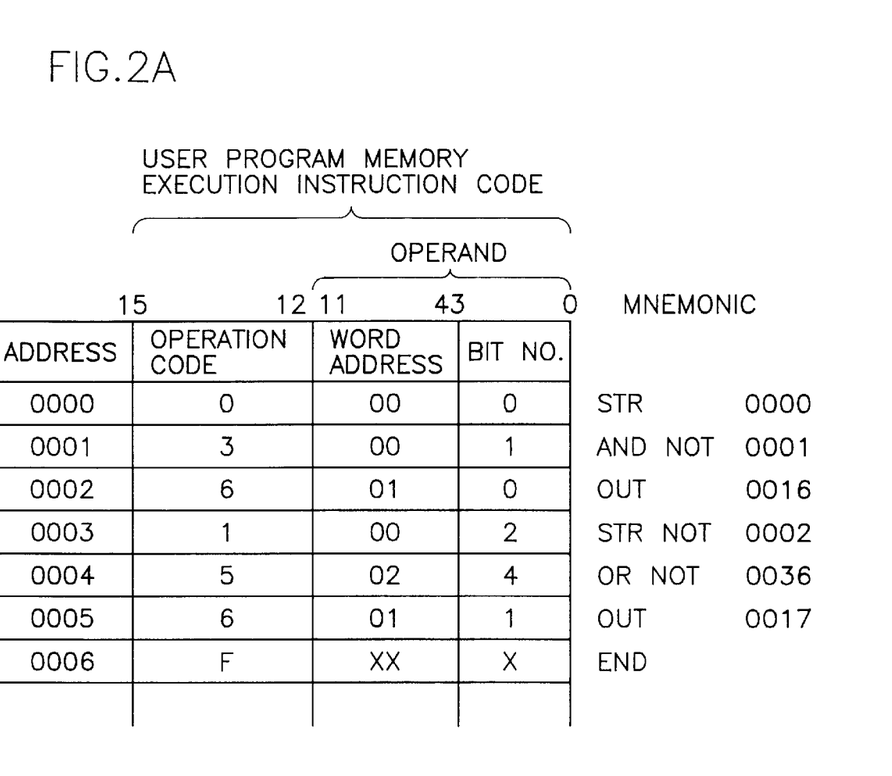
FIG. 2A is a table illustrating an exemplary set of user definable instruction codes stored in the user memory in the programmable logic controller of FIG. 1A.

Referring to FIG. 2A, the execution instruction includes an instruction code which normally consists of two parts: operation code and operand. The operation code includes operation data associated with the execution of the user data, and the operand includes a word address and a bit number. The word address refers to the location of a corresponding user data stored in data memory 90, and the bit number refers to the position of a bit within the word. This bit is used to store the result of the logical operation associated with the execution instruction.

As described above, the execution instruction is temporarily stored in execution instruction memory 70, and provided to second multiplexer 80 therefrom via the instruction bus. The word address of the instruction is then temporarily stored in multiplexer 80 in accordance with control signal –G2 which is concurrently applied to enable terminal –E of second bidirectional buffer 100. The word address stored in second multiplexer 80 is provided to data memory 90, via the third address bus, and the user data stored in data memory 90 corresponding to the word address is read out and provided to a data terminal D of logic/decoding unit 140, via the third data bus, and to CPU 10, via the first bus system through second bidirectional buffer 100.

Execution instruction memory 70 also provides the same execution instruction, via the instruction bus, to an instruction input terminal I of logic/decoding unit 140. Then, logic/decoding unit 140 decodes the execution instruction, using the operation code and the bit number in the instruction, and the user data provided to its data terminal D of logic/decoding unit 140 from data memory 90 via the third bus system.

Of the execution instructions provided to logic/decoding unit 140, if the instruction corresponding to a mnemonic "OUT" (shown in FIG. 2A) is decoded, logic/decoding unit 140 provides a corresponding signal to operation state controller 130 through its output terminal OUT, whereby operation state controller 130 produces an appropriate operation control signal corresponding to the corresponding signal. Operation state controller 130 checks the state of flag register 110 at all times.

If the instruction corresponding to a mnemonic "END" (shown in FIG. 2B) is provided to logic/decoding unit 140 to terminate the execution during the execution of the ladder instruction (i.e., execution instruction), logic/decoding unit 140 provides a high level "H" signal, via its END terminal, to a clear terminal CLR of flag register 110, to clear flag register 110, whereby the signal at an output terminal Q of flag register 110 becomes a low level: "L". Therefore, if operation state controller 130 provides a control signal to terminate the execution, buffer 120 provides an output signal to CPU 10 via the first data bus in response to an enable signal –E3 from address decoder 20, and CPU 10 in turn checks the state of flag register 110 via the first data bus and decides whether the execution of the instruction stored in user memory 50 be terminated.

A more detailed description of the operation of the high speed ladder instruction process system of the programmable logic controller according to the embodiment of the present invention is provided below in reference to FIGS. 2A and 2B, and FIG. 3.

Figure 2B:
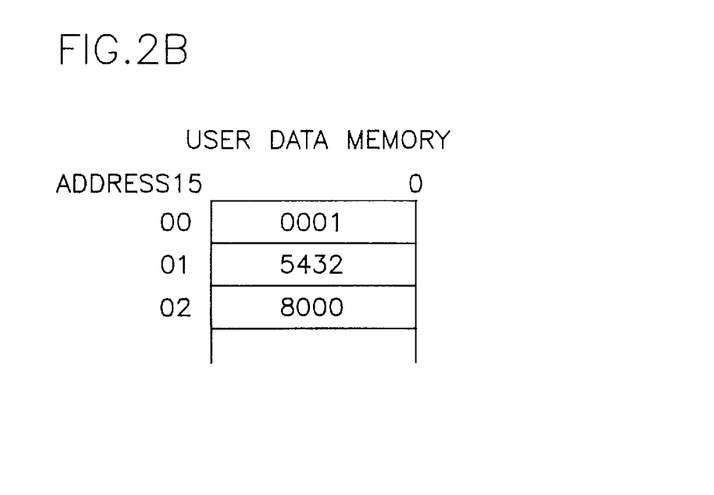
FIG. 2B is a table illustrating an exemplary set of user definable data stored in the data memory in the programmable logic stroller of FIG. 1B.
Figure 3A:
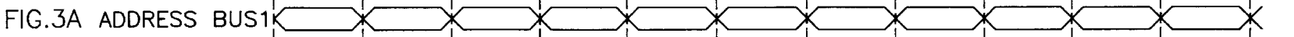
FIGS. 3A to 3T are an exemplary set of the time chart for signals at various processing stages of the programmable logic controller of FIGS. 1A and 1B.
Figure 3B:
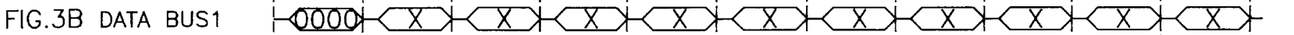
Figure 3C:
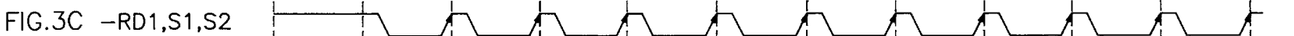
Figure 3D:
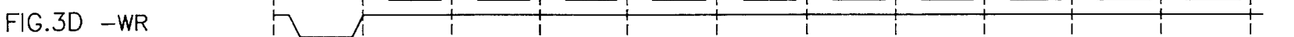
Figure 3E:
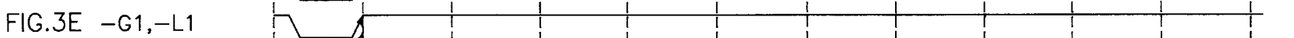
Figure 3F:
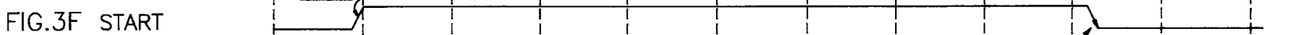
Figure 3G:
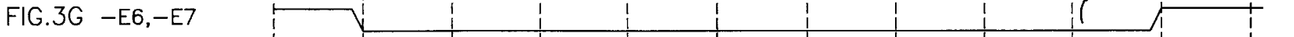
Figure 3H:
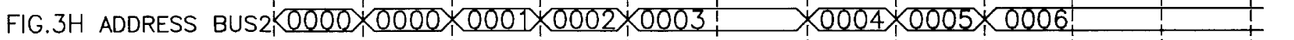
Figure 3I:
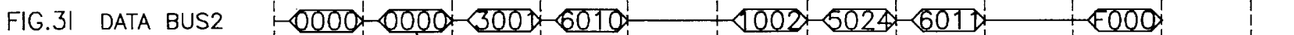
Figure 3J:
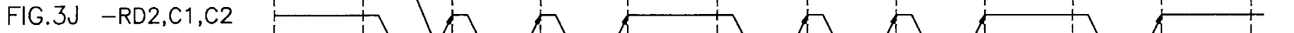
Figure 3K:
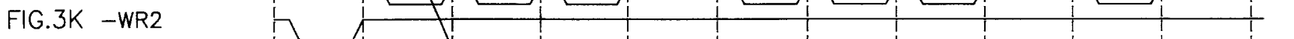
Figure 3L:
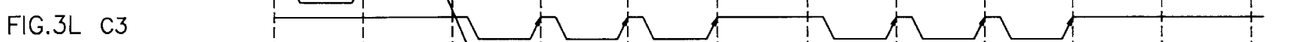
Figures 3M, 3N:
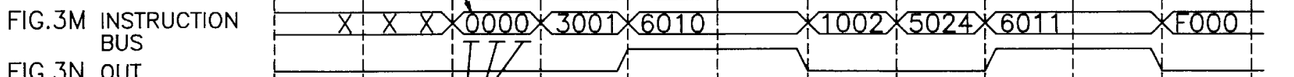
Figure 3O:
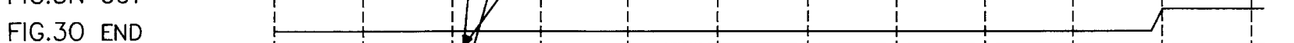
Figure 3P:
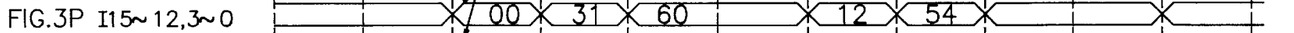
Figure 3Q:
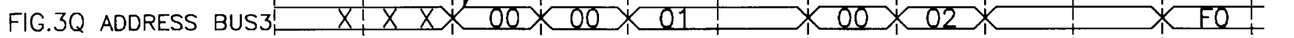
Figure 3R:
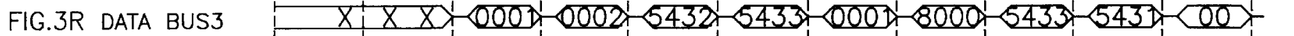
Figure 3S:
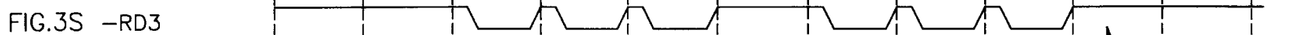
Figure 3T:
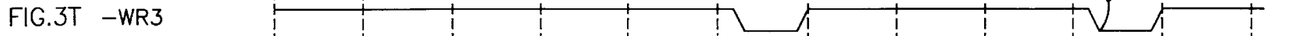

An exemplary program of execution instructions (i.e., ladder instructions) and an exemplary set of data, to be provided by the user at the beginning of the operation, are illustrated in FIGS. 2A and 2B, respectively. The instruction program and user data are stored in user memory 50 and data memory 90, respectively. CPU 10 initializes, i.e., sets the initial value of, program counter 30 to initiate the execution of the execution instruction program stored in user memory 50. More specifically, to initialize program counter 30, CPU 10 provides the latch signal –L1 with a low signal level "L" via address decoder 20, as shown in a time chart (E) in FIG. 3. When the low level "L" latch signal –L1 is provided to a latch input terminal –L of program counter 30, program counter 30 is put in a latch state.

Control signals –G1 and –G2 having a low level "L" from operation state controller 130 are provided to first and second bidirectional buffers 60 and 100, to enable first and second bidirectional buffers 60 and 100, as shown in time chart (E) in FIG. 3. Therefore, as shown in a time chart (B) in FIG. 3, the initial value of program counter 30 is set to a zero "0" value by applying a "0000" value to program counter 30 through first bidirectional buffer 60 on the first data bus which is connected to a data terminal D of CPU 10.

When program counter 30 is initialized as such, CPU 10 then provides the latch signal –L1 with a high signal level "H" through the address decoder 20 and causes the control signals –G1 and –G2 to be high as shown in time chart (E) in FIG. 3, and then applies the high level "H" signal to latch input terminal –L of program counter 30. Since a clock terminal CK of flag register 110 is connected to latch input terminal –L, the high level "H" signal now operates as a clock signal to flag register 110 and is provided to a START terminal of operation state controller 130, via output terminal Q of flag register 110. Operation state controller 130 provides appropriate control signals to execute the user defined execution instruction stored in user memory 50 in accordance with the signal provided to its START terminal from flag register 110, as shown in a time chart (F) in FIG. 3.

As shown in a time chart (G) in FIG. 3, operation state controller 130 provides enable signals –E6 and –E7 having a low level "L" to enable user memory 50 and data memory 90. Further, as shown in time charts (J), (L) and (S) in FIG. 3, operation controller 130 provides clock signals Cl, C2, and C3 and read signals –RD2 and –RD3 to enable the reading of the data stored in user memory 50 and data memory 90.

A decoder 20 provides an enable signal –E3 to buffer 120 and this enables CPU 10 to sense the output of buffer 120 to check the state of flag register 110 via the first data bus and determine whether the ladder (execution) instructions executed based on the checked status. When a high level "H" signal is applied to the START terminal of operation state controller 130, first and second bidirectional buffers 60 and 100, which buffers are commonly connected to the first data bus of CPU 10, are disabled by signals S1 and S2 from operation state controller 130, and the operation of first and the second bidirectional buffers 60 and 100 is inhibited.

First and second multiplexers 40 and 80 have one input terminal A commonly connected to the first address bus of CPU 10, and another input terminal B connected to program counter 30 and execution instruction memory 70, respectively. First and second multiplexers 40 and 80 selectively provide a signal from program counter 30 and execution instruction memory 70, respectively. Further, the ladder (execution) instruction stored in user memory 50 is executed in accordance with the control signals from operation state controller 130.

For example, when the initial zero "0" value of program counter 30 is provided to first multiplexer 40, via the second address bus, and subsequently to an address terminal A of user memory 50, as shown in a time chart (H) in FIG. 3, of the instructions stored in user memory 50, the instruction corresponding to a mnemonic "STR 0000", which instruction is stored in an address "0000" (shown in FIG. 2A) in user memory 50, is provided to the second data bus, as shown in a time chart (I) in FIG. 3.

Referring to time chart (J) in FIG. 3, each time control signal C2 from operation state controller 130 is provided to a terminal C2 of execution instruction memory 70, control signal C2 operates as a clock signal and execution instruction memory 70 provides the execution instruction temporarily stored therein to the instruction bus. Likewise, each time control signal Cl from operation state controller 130 is provided to program counter 30 via its terminal C1, control signal C1 operates as a clock signal and the value of program counter 30 is incrementally increased to designate the address of the execution instruction to be executed.

For example, referring to a time chart (M) in FIG. 3, the execution instruction corresponding to a mnemonic "STR 0000", which is temporarily stored in execution instruction memory 70, is provided to the instruction bus. Referring to a time chart (Q) in FIG. 3, a corresponding word address "00" (shown in FIG. 2A) which is included in the execution instruction is provided to second multiplexer 80, and subsequently to the third address bus, to designate the (word) address of data memory 90 and access a corresponding user data therein.

Referring to a time chart (P) in FIG. 3, a bit number "00" (shown in FIG. 2A) which is also included in the execution instruction is provided to instruction input terminal I of logic/decoding unit 140. Referring to a time chart (I) in FIG. 3, in the above example, when word address "00" (shown in FIG. 2A) is designated in data memory 90 via the third address bus, a corresponding data "0001" stored in address "00" (shown in FIG. 2B) in data memory 90 is provided, via the third data bus, to an input terminal D of logic/decoding unit 140. When the execution instruction from execution instruction memory 70 and the user data from the designated word address in data memory 90 are provided to input terminals I and D of unit 140, respectively, logic/decoding unit 140 decodes the execution instruction, and executes the decoded instruction using the user data provided thereto in response to control signal C3 from operation state controller 130 provided to its clock terminal C3.

As described above, referring to time chart (J) in FIG. 3, the address in which the execution instruction is stored in program counter 30 is incrementally increased in response to control signal C1 provided thereto from operation state controller 130, and execution instruction memory 70 provides the execution instruction stored therein to the instruction bus in response to control signal C2 simultaneously provided thereto from operation state controller 30. The signal corresponding to the user execution instruction provided to the second address bus and the second data bus is shown in time charts (H) and (I) in FIG. 3, respectively. The user data provided to the third data bus is shown in a time chart (R) in FIG. 3, and related control signals from operation state controller 130 in time chart (J) in FIG. 3.

As described above, referring to time chart (J) in FIG. 3, operation state controller 130 provides control signals C1 and C2 simultaneously to clock terminal C1 of program counter 30 and clock terminal C2 of execution instruction memory 70, respectively. Therefore, program counter 30 and execution instructing memory 70 are effected at the substantially same time. For example, in the conventional PLC having a single bus system structure, the processing (i.e., execution) of the user execution instruction and the accessing (i.e., reading) of the user data are carried out at different time periods because the execution instruction has to be processed before the user data is accessed. In contrast, in the PLC of the present invention, since its instruction process system uses a multiple bus system structure, the processing of the user execution instruction and the accessing of the user data are carried out during the same process cycle, thus saving the overall process time.

For example, in the conventional system having a single bus system structure, during a processor cycle n having a first portion and a second portion immediately following the first portion, a user execution instruction u(n) is first processed during the first portion of processor cycle n, and a user data d(n) is subsequently accessed using the processed instruction u(n) during the second portion of processor cycle n. Likewise, a next user instruction u(n+1) immediately following u(n) is processed during the first portion of a next processor cycle n+1 immediately following processor cycle n and a corresponding user data d(n+1) is subsequently accessed during the second portion of processor cycle n+1. Therefore, to process and access user instruction u(n) and user data d(n), and subsequent user instruction u(n+1) and data d(n+1), it requires two process cycles n and n+1.

In contrast, according to the present invention, during the first portion of process cycle n, execution instruction u(n) is processed. However, during the second portion of process cycle n, user instruction u(n+1) is processed and user data d(n) are simultaneously accessed. Likewise, during the first portion of process cycle n+1, the subsequent user instruction u(n+2) is processed and user data d(n+1) is simultaneously accessed.

Referring to FIGS. 1A and 1B, according to the embodiment of the present invention, control signals C1 and C2 from operation state controller 130 are simultaneously applied to program counter 30 and execution instruction memory 70, respectively. During process cycle n+1, in response to control signal C1, program counter 30 increments the count value and provides the incremented value to user memory 50 as an address for a corresponding execution instruction u(n+1) stored therein via the second address bus. Then, the corresponding execution instruction u(n+1) stored in the address in user memory 50 is provided to execution instruction memory 70, via the second data bus, to be temporarily stored therein. During the same process cycle n+1, in response to control signal C2, which control signal is provided from operation state controller 130 simultaneously with control signal C1, execution instruction memory 70 provides an execution instruction u(n), which instruction has been stored therein during an earlier process cycle n and which instruction includes the address for a corresponding user data d(n), to data memory 90, via the third address bus. Yet during the same process cycle n+1, data memory 90 provides user data d(n) stored therein to logic/decoding unit 140 via the third data bus, for further processing. Therefore, the execution of user execution instruction u(n+1) corresponding to process cycle (n+1) and the accessing of user data d(n) corresponding to the earlier process cycle n are simultaneously carried out.

More specifically, referring to FIG. 2B, when clock signal C1 is toggled, if the incremented address provided from program counter C1 to the second address bus is "0002", that address in user memory 50 stores the instruction corresponding to a mnemonic "OUT 0016." Then a corresponding instruction code "6010" is provided to the second data bus. Of code "6010", "6" refers to the operation code, "01" to the word address and "0" the bit number. When control signal C1 is again toggled, the address from program counter 30 is incremented to "0003" and provided to the second address bus a signal as shown in time chart (H) in FIG. 3. This "0003" address directs to a instruction code "1002" corresponding to a mnemonic "STR NOT 0002" and this "1002" instruction code is then provided to the second data bus, after elapse of a predetermined time t, as shown in time chart (I) in FIG. 3.

Similarly, in response to control signal C1, if the address corresponding to an execution instruction code "6010" mnemonic "OUT 0017" in FIG. 2A is provided to the second data bus from user memory 50, the same instruction from execution instruction memory 70 is later provided to the instruction bus in response to control signal C2 to execute the instruction by logic/decoding unit 140 during a predetermined time period t, as shown in a time chart (N) in FIG. 3. Referring to FIG. 2B, word address "01" refers to an address in data memory 90, and this address is provided from execution instruction memory 70, via second multiplexer 80. The operation code and bit number in the execution instruction code are provided from execution instruction memory 70 to logic/decoding unit 140 via its input terminal I.

For example, referring to time chart (N) in FIG. 3, during the execution of the "OUT 0017" instruction, after operation code "6" and bit number "0" are provided to logic/decoding unit 140, logic/decoding unit 140 decodes the execution instruction code as such, and provides, via its output terminal OUT, a high level "H" signal to operation state controller 130 for a predetermined time period t until the execution of the "OUT 0017" instruction is completed. Upon recognition of the high level "H" signal from logic/decoding unit 140, operation state controller 130 executes the operations associated with the "OUT 0017" instruction. Further, referring to time chart (J) in FIG. 3, control signals C1 and C2, and a second read signal –RD2 are maintained in the high "H" level during the predetermined time t, to disable the reading of the address from user memory 50 corresponding to the subsequent execution instruction stored therein while the output operations are executed.

Referring to time chart (R) in FIG. 3, if word address "01"(shown in FIG. 2B) in data memory 90 is designated, data "5432" (shown in FIG. 2B) is provided to the third data bus and then to logic/decoding unit 140. Then, logic/decoding unit 140 performs a logical operation corresponding to the execution instruction provided thereto with user data "5432", and stores the result of the logical operation at a specified bit number within word address "01". A third write signal –WR3 having a low signal level "L" is provided from operation state controller 130 during the predetermined time t to effect the storing of data in data memory 90. The result of the logical operation is stored in data memory 90 via the third data bus while third write signal –WR3 of operation state controller 130 maintains the low "L" level, and second read signal –RD2 and control signals C1 and C2 are provided as shown in time chart (J) in FIG. 3.

After the result of the logical operation is stored in data memory 90, logic/decoding unit 140 provides a low level "L" signal, via its OUT terminal, to operation state controller 130 to indicate that the effected operation is completed. Then, operation state controller 130 in turn provides third read signal –RD3 and third write signal –WR3, as shown in time charts (S) and (T) in FIG. 3, respectively, to read the data stored in data memory 90, and its corresponding operation is continuously executed in logic/decoding unit 140.

If an instruction code "F000" corresponding to a mnemonic "END" (shown in FIG. 2A) in execution instruction memory 70 is effected, the process for terminating the execution of the execution instruction program is effected. Referring to a time chart (0) in FIG. 3, logic/decoding unit 140 decodes the END instruction and provides a high level "H" signal, via its END terminal, to clear (i.e., set to a low signal level "L") a clear terminal CLR of flag register 110, which terminal otherwise provides high "H" signals during the time when the program is executed.

Accordingly, the low level "L" signal is provided to flag resister 110 via its an output terminal Q. Upon recognition of the low level "L" signal from flag register 110, operation state controller 130, which checks the output state of flag resister 110 at all times, interprets that the "END" instruction has been provided and provides a control signal to appropriate control terminals to execute the END operation to terminate the execution of the program, whereby CPU 10 checks the state of flag resister 110 and executes appropriate operations after the execution of the program is terminated.

As described above, according to the embodiment of the present invention, the overall process time is significantly reduced because the execution of the user execution instruction and the access of the user data are simultaneously carried out, using a plurality of bus (i.e., a pair of address/data buses) systems instead of a single bus system, thus resulting in significant savings in overall process time. Yet further, the above mentioned improvements can be accomplished without additional costs.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A high speed instruction process system for a programmable logic controller, comprising:

first means for storing a plurality of user instructions of cycle;

second means for accessing said user instructions;

third means for storing a plurality of user data of the process, each data corresponding to a different process cycle;

fourth means, coupled to said third means, for accessing the stored user data; and fifth means, coupled to said second and fourth means, for simultaneously operating said fourth means to access the user data corresponding to a first process cycle and said second means to access one of said user instructions corresponding to a second process cycle following the first process cycle by a single process cycle, and for processing the user data.

2. The high speed instruction process system of claim 1, further comprising:

flag means for generating an operation start signal in accordance with enable signals and an operation end signal in accordance with a clear signal; and a buffer for providing execution/end signals so that a status of the flag means is read.

3. The high speed instruction process system of claim 1, further comprising:

a first bi-directional buffer for providing a first enable signal when a program counter is initialized; and a second bi-directional buffer for providing a second enable signal when the third means is accessed.

4. The high speed instruction process system of claim 1, wherein a central processing means selects an address from the first means through a first address bus, and accesses the first means through a first data bus.

5. The high speed instruction process system of claim 1, wherein the first means is selected by an address from a program counter through a second address bus and provides a data bus with the user instructions.

6. The high speed instruction process system of claim 1, wherein the third means is selected by an address from a means for storing execution instructions through an address bus and provides a data bus with the user data.

7. The high speed instruction process of claim 6, wherein a logic means processes the execution instructions and stores a result of the processed execution instructions to the third means.

8. The high speed instruction process system of claim 1, wherein a program counter provides an address of a next user instruction by increasing counting values according to a clock signal.

9. The high speed instruction process system of claim 1, wherein an operation state controller processes binary data, increasing an address of a program counter and a means for storing execution instructions by sending clock signals.

* * * * *

UNITED STATES PATENT AND TRADEMARK OFFICE
CERTIFICATE OF CORRECTION

PATENT NO. : 5,809,319
DATED : September 15, 1998
INVENTOR(S) : Young-ki KIM

It is certified that error appears in the above-indentified patent and that said Letters Patent is hereby corrected as shown below:

Claim 1, Col. 9, line 28, before "cycle;", insert --a process, each instruction corresponding to a different process--.

Claim 7, Col. 10, line 27, after "process", insert --system--.

Signed and Sealed this

Twentieth Day of July, 1999

Attest:

Q. TODD DICKINSON

*Attesting Officer*            *Acting Commissioner of Patents and Trademarks*